(12) United States Patent
Pan et al.

(10) Patent No.: US 11,175,444 B1
(45) Date of Patent: Nov. 16, 2021

(54) LUMINOUS KEYBOARD AND BACKLIGHT MODULE THEREOF

(71) Applicant: Primax Electronics Ltd., Taipei (TW)

(72) Inventors: Chin-Sung Pan, Taipei (TW); Lei-Lung Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/183,885

(22) Filed: Feb. 24, 2021

(30) Foreign Application Priority Data

Jan. 7, 2021 (TW) ................................ 110100610

(51) Int. Cl.
*G02B 6/00* (2006.01)
*F21V 8/00* (2006.01)
*F21V 11/14* (2006.01)

(52) U.S. Cl.
CPC ............ *G02B 6/0055* (2013.01); *F21V 11/14* (2013.01); *G02B 6/0031* (2013.01)

(58) Field of Classification Search
CPC .. G02B 6/0021; G02B 6/0023; G02B 6/0031; G02B 6/0055; F21V 11/14; F21V 33/0052; H01H 13/83; H01H 9/161; H01H 9/182; H01H 2009/183
See application file for complete search history.

(56) References Cited

U.S. PATENT DOCUMENTS

| 2010/0085774 | A1* | 4/2010 | Park | G02B 6/0055 362/619 |
| 2012/0274875 | A1* | 11/2012 | Sakita | G02B 6/0021 362/612 |
| 2012/0300135 | A1* | 11/2012 | Cho | G02B 6/0021 362/609 |
| 2014/0009903 | A1* | 1/2014 | Peng | G02B 6/0055 362/23.03 |
| 2014/0240999 | A1* | 8/2014 | Roberts | B60Q 1/2615 362/510 |
| 2017/0168230 | A1* | 6/2017 | Byun | G02B 6/0091 |
| 2021/0005407 | A1* | 1/2021 | Lin | H01H 13/83 |

* cited by examiner

*Primary Examiner* — Y M. Quach Lee
(74) *Attorney, Agent, or Firm* — Kirton McConkie; Evan R. Witt

(57) ABSTRACT

A luminous keyboard includes a keyboard module and a backlight module. The backlight module is located under the keyboard module. The backlight module includes a light source, a light guide plate and a reflecting plate. The light source includes a conductive substrate and plural light-emitting elements. The light guide plate includes a light input surface, a light exit surface, a bottom surface and a first slot. The light input surface is disposed within the first slot. The reflecting plate is disposed on the bottom surface of the light guide plate. The reflecting plate includes a second slot. The second slot is in communication with the first slot. The conductive substrate is penetrated through the second slot and the first slot. Consequently, the plural light-emitting elements are accommodated within the first slot and aligned with the light input surface.

6 Claims, 4 Drawing Sheets

LUMINOUS KEYBOARD AND BACKLIGHT MODULE THEREOF

FIELD OF THE INVENTION

The present invention relates to an input device, and more particularly to a luminous keyboard.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example mouse devices, keyboard devices, trackball devices, or the like. Via the keyboard device, characters or symbols can be inputted into the computer system directly. As a consequence, most users and most manufacturers of input devices pay much attention to the development of keyboard devices.

With increasing development of keyboard devices, a keyboard device with a backlight module has been introduced into the market. The keyboard device with the backlight module is also referred as a luminous keyboard. When the luminous keyboard is used in an indoor lighting environment such as an office or a room, the human eyes can obviously recognize that the light beams from a bottom side of the luminous keyboard illuminate all keys of the luminous keyboard. Consequently, a visual effect is generated.

FIG. 1 is a schematic cross-sectional view illustrating a portion of a backlight module of a conventional luminous keyboard. As shown in FIG. 1, the conventional backlight module 1 comprises an insulation substrate 100, a reflective layer 110, a light guide layer 120, a micro light-emitting diode 130 and a reflective film 140. The insulation substrate 100 and a reflective slant 1400 of the reflective film 140 are separated from each other. Consequently, a vacant space 1401 is formed between the insulation substrate 100 and the reflective film 140. The micro light-emitting diode 130 emits light beams. The portion of the light beams that projected upwardly are transferred through the vacant space 1401 and introduced into the light guide layer 120 through an input surface 1200 of the light guide layer 120. The edge of the reflective film 140 and the edge of the light guide layer 120 are attached on each other. Consequently, the top side of the input surface 1200 of the light guide layer 120 is sealed by the reflective film 140. In this way, it can be assured that the reflected light beams are introduced into the light guide layer 120 through the input surface 1200 of the light guide layer 120. In addition, after the light beams are introduced into the reflective layer 110, the light beams are reflected by the reflective layer 110. Consequently, the light beams in the form of a surface light source are outputted from the light guide layer 120. However, after the upwardly-projected portions of the light beams from the micro light-emitting diode 130 are transferred through the vacant space 1401, the light beams may be introduced into the light guide layer 120 through a lateral surface of the light guide layer 120.

As known, the conventional backlight module 1 still has some drawbacks. For example, the micro light-emitting diode 130 is horizontally arranged on the insulation substrate 100. In addition, the light beams from the micro light-emitting diode 130 are projected upwardly along a vertical direction, reflected by the overlying reflective film 140, and introduced into the light guide layer 120. In other words, the upwardly-projected portions of the light beams are not directly introduced into the light guide layer 120, the portions of the light beams reflected by the reflective film 140 are not completely introduced into the light guide layer 120, and portions of the reflected light beams are possibly leaked out from the underlying region of the light guide layer 120. Consequently, the luminous efficiency of the backlight module 1 is largely impaired.

Therefore, there is a need of providing an improved luminous keyboard in order to overcome the above drawbacks.

SUMMARY OF THE INVENTION

An object of the present invention provides a luminous keyboard with a backlight module. In the backlight module, plural light-emitting elements and a light input surface of a light guide plate are aligned with each other. Due to this structural design, the light beams from the plural light-emitting elements can be directly introduced into the light guide plate without any refection. Consequently, the light utilization loss is effectively reduced, and the luminous efficiency is enhanced.

An object of the present invention provides a backlight module. In the backlight module, plural light-emitting elements and a light input surface of a light guide plate are aligned with each other. Due to this structural design, the light beams from the plural light-emitting elements can be directly introduced into the light guide plate without any refection. Consequently, the light utilization loss is effectively reduced, and the luminous efficiency is enhanced.

The other objects and advantages of the present invention will be understood from the disclosed technical features.

In accordance with an aspect of the present invention, a luminous keyboard is provided. The luminous keyboard includes a keyboard module and a backlight module. The backlight module is located under the keyboard module. The backlight module includes a light source, a light guide plate and a reflecting plate. The light source includes a conductive substrate and plural light-emitting elements. The plural light-emitting elements are installed on the conductive substrate. The light guide plate includes a light input surface, a light exit surface, a bottom surface and a first slot. The light input surface is arranged between the light exit surface and the bottom surface. The light exit surface is located at a first side of the light guide plate close to the keyboard module. The bottom surface is located at a second side of the light guide plate away from the keyboard module. The first slot runs through the light guide plate from the light exit surface to the bottom surface. The light input surface is disposed within the first slot. The reflecting plate is disposed on the bottom surface of the light guide plate. The reflecting plate includes a second slot. The second slot is in communication with the first slot. The conductive substrate is penetrated through the second slot and the first slot. Consequently, the plural light-emitting elements are accommodated within the first slot and aligned with the light input surface.

In an embodiment, the conductive substrate includes a lateral wall, a first extension wall and a second extension wall. The first extension wall is extended from a first end of the lateral wall and located over the light guide plate. The second extension wall is extended from a second end of the lateral wall and located under the reflecting plate. The second end and the first end of the lateral wall are opposed to each other. The plural light-emitting elements are arranged between the lateral wall and the light input surface of the light guide plate.

In an embodiment, the conductive substrate is a transparent substrate, an opaque substrate, a translucent substrate or an insulation substrate.

In an embodiment, the conductive substrate is made of polyethylene terephthalate (PET), polyethylene naphthalate (PEN), polyimide (PI), glass, polycarbonate (PC) or polymethyl methacrylate (PMMA).

In an embodiment, the plural light-emitting elements are micro light-emitting diodes.

In an embodiment, the backlight module further includes a light shielding plate, and the light shielding plate is arranged between the keyboard module and the light guide plate. The light shielding plate includes at least one light-transmissible region and at least one light-shielding region.

In an embodiment, the plural light-emitting elements emit light beams. After the light beams are introduced into the light guide plate through the light input surface of the light guide plate, the light beams are exited from the light exit surface of the light guide plate. After the light beams are exited from the light exit surface of the light guide plate, the light beams are transmitted through the at least one light-transmissible region of the light shielding plate and transferred to the keyboard module.

In accordance with another aspect of the present invention, a backlight module for a luminous keyboard is provided. The backlight module is located under a keyboard module of the luminous keyboard. The backlight module includes a light source, a light guide plate and a reflecting plate. The light source includes a conductive substrate and plural light-emitting elements. The plural light-emitting elements are installed on the conductive substrate. The light guide plate includes a light input surface, a light exit surface, a bottom surface and a first slot. The light input surface is arranged between the light exit surface and the bottom surface. The light exit surface is located at a first side of the light guide plate close to the keyboard module. The bottom surface is located at a second side of the light guide plate away from the keyboard module. The first slot runs through the light guide plate from the light exit surface to the bottom surface. The light input surface is disposed within the first slot. The reflecting plate is disposed on the bottom surface of the light guide plate. The reflecting plate includes a second slot. The second slot is in communication with the first slot. The conductive substrate is penetrated through the second slot and the first slot. Consequently, the plural light-emitting elements are accommodated within the first slot and aligned with the light input surface.

From the above descriptions, the present invention provides the luminous keyboard. The light source of the backlight module comprises the conductive substrate and the plural light-emitting elements on the conductive substrate. After the conductive substrate is penetrated through the second slot of the reflecting plate and the first slot of the light guide plate, the plural light-emitting elements are disposed within the first slot of the light guide plate and aligned with the light input surface of the light guide plate. Due to this structural design, the light beams from the plural light-emitting elements on the conductive substrate can be directly introduced into the light guide plate without any refection. Consequently, the light utilization loss is effectively reduced, and the luminous efficiency is enhanced. Moreover, the conductive substrate of the light source is a cost-effective insulation substrate (e.g., a PET substrate) in replace of the costly flexible printed circuit board (FPC) of the conventional backlight module. Since the PET substrate has higher rigidity than the flexible printed circuit board (FPC), the plural light-emitting elements can be upright located beside the light input surface of the light guide plate and the plural light-emitting elements can be stably aligned with the light input surface of the light guide plate without deviation. In other words, the backlight module of the present invention can provide the better luminous efficiency while largely reducing the fabricating cost.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
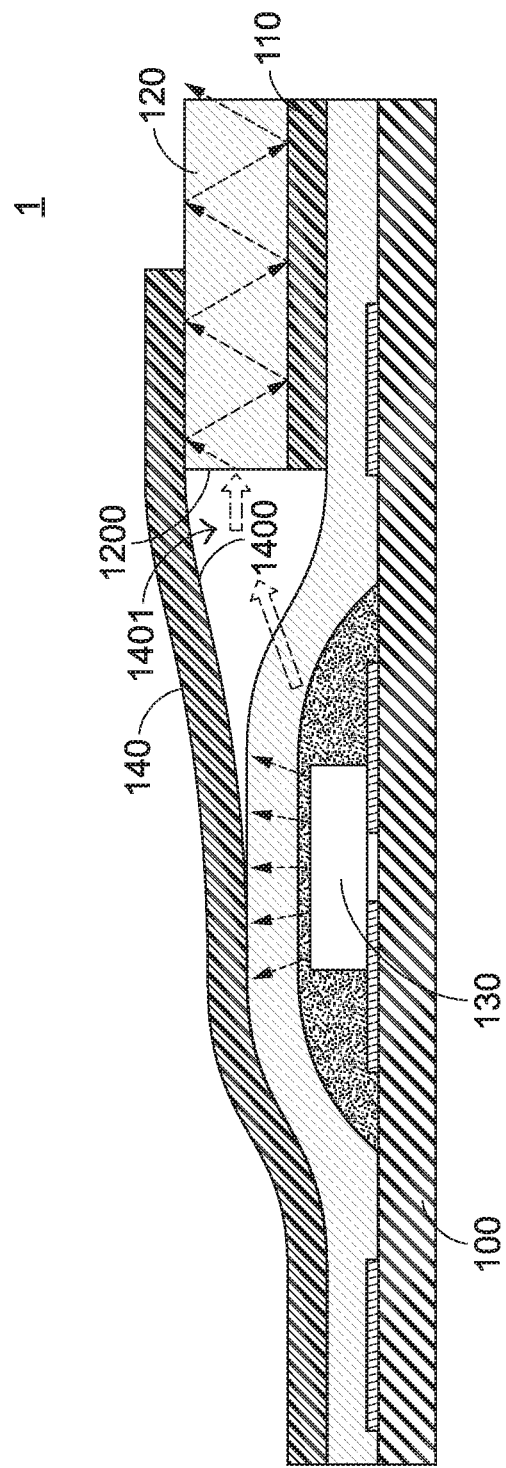
FIG. 1 is a schematic cross-sectional view illustrating a portion of a backlight module of a conventional luminous keyboard.
Figure 2:
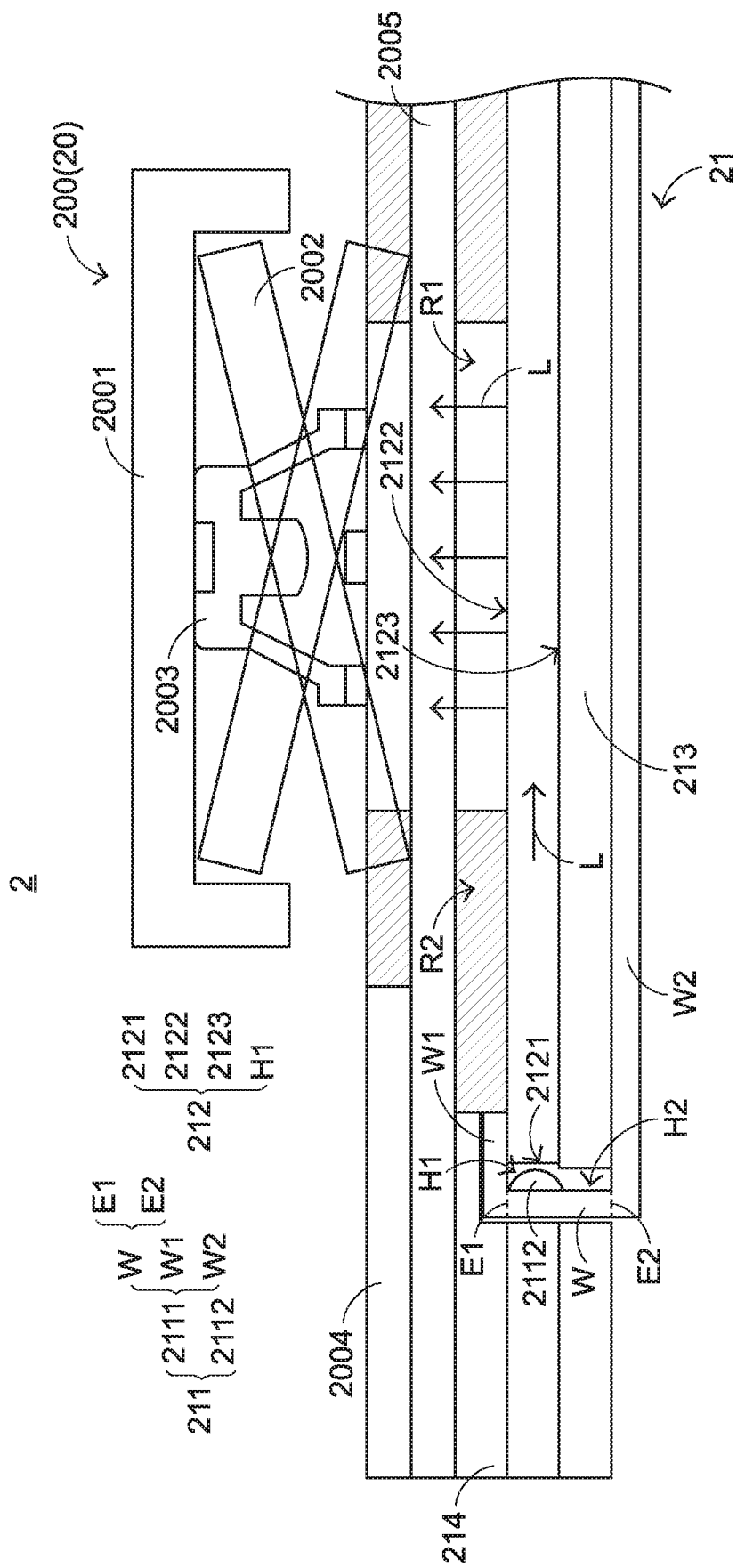
FIG. 2 is a schematic cross-sectional view illustrating a luminous keyboard according to an embodiment of the present invention.

FIG. 2 is a schematic cross-sectional view illustrating a luminous keyboard according to an embodiment of the present invention. As shown in FIG. 2, the luminous keyboard 2 comprises a keyboard module 20 and a backlight module 21. The backlight module 21 is located under the keyboard module 20. In this embodiment, the keyboard module 20 comprises plural key structures 200. These key structures 200 are classified into some types, e.g., ordinary keys, numeric keys and function keys. When one of the key structures 200 is depressed by the user's finger, the luminous keyboard 2 generates a corresponding key signal to a computer (not show), and thus the computer executes a function corresponding to the depressed key structure. For example, when an ordinary key is depressed, a corresponding English letter or symbol is inputted into the computer. When a numeric key is depressed, a corresponding number is inputted into the computer. In addition, the function keys (F1-F12) can be programmed to provide various quick access functions. The key structure 200 is a Space key, a Shift key or any other similar multiple key with the larger area and length.

As shown in FIG. 2, the key structure 200 comprises a keycap 2001, an ascending/descending connection assembly 2002 (e.g., a scissors-type connection assembly), an elastic element 2003, a membrane circuit board 2004 and a supporting plate 2005. The keycap 2001 is located over the membrane circuit board 2004. The supporting plate 2005 is arranged between the membrane circuit board 2004 and the backlight module 21. The ascending/descending connection assembly 2002 is arranged between the keycap 2001 and the supporting plate 2005. The elastic element 2003 is arranged between the keycap 2001 and the membrane circuit board 2004. For succinctness, only one key structure 200 is shown in FIG. 2. In each key structure 200 of the keyboard module 20, the keycap 2001, the ascending/descending connection assembly 2002, the elastic element 2003, the membrane circuit board 2004 and the supporting plate 2005 are sequentially arranged in a stack form.

The structure of the backlight module 21 will be illustrated in more details as follows.

As shown in FIG. 2, the backlight module 21 of this embodiment comprises a light source 211, a light guide plate 212, a reflecting plate 213 and a light shielding plate 214.

The light source 211 comprises a conductive substrate 2111 and plural light-emitting elements 2112. The plural light-emitting elements 2112 are installed on the conductive substrate 2111. Preferably but not exclusively, the light-emitting elements 2112 are micro light-emitting diodes.

The light guide plate 212 comprises a light input surface 2121, a light exit surface 2122, a bottom surface 2123 and a first slot H1. The light input surface 2121 of the light guide plate 212 is arranged between the light exit surface 2122 and the bottom surface 2123. The light exit surface 2122 of the light guide plate 212 is located at a first side of the light guide plate 212 close to the keyboard module 20. The bottom surface 2123 of the light guide plate 212 is located at a second side of the light guide plate 212 away from the keyboard module 20. That is, the light exit surface 2122 and the bottom surface 2123 of the light guide plate 212 are opposed to each other. The first slot H1 of the light guide plate 212 runs through the light guide plate 212 from the light exit surface 2122 to the bottom surface 2123. In addition, the light input surface 2121 is disposed within the first slot H1.

The reflecting plate 213 is disposed on the bottom surface 2123 of the light guide plate 212. In addition, the reflecting plate 213 comprises a second slot H2. The second slot H2 is in communication with the first slot H1 of the light guide plate 212. The conductive substrate 2111 of the light source 211 is penetrated through the second slot H2 of the reflecting plate 213 and the first slot H1 of the light guide plate 212. Consequently, the light-emitting elements 2112 on the conductive substrate 2111 are accommodated within the first slot H1 of the light guide plate 212 and aligned with the light input surface 2121 of the light guide plate 212.

A method of forming the first slot H1 and the second slot H2 will be described as follows. In an embodiment, the first slot H1 and the second slot H2 are formed in the corresponding positions of the light guide plate 212 and the reflecting plate 213, respectively. Then, the light guide plate 212 and the reflecting plate 213 are assembled with each other, so that the first slot H1 and the second slot H2 are in communication with each other. In another embodiment, the light guide plate 212 and the reflecting plate 213 are assembled with each other. Then, a drilling process is performed to form the first slot H1 and the second slot H2 are formed in the corresponding positions of the light guide plate 212 and the reflecting plate 213, respectively. Consequently, the first slot H1 and the second slot H2 are in communication with each other.

The light shielding plate 214 is arranged between the keyboard module 20 and the light guide plate 212. The light shielding plate 214 covers the light exit surface 2122 of the light guide plate 212. In an embodiment, the light shielding plate 214 comprises at least one light-transmissible region R1 and at least one light-shielding region R2. The light-transmissible region R1 is aligned with the corresponding key structure 200 of the keyboard module 20. Moreover, a white reflecting layer (not shown) is printed on a bottom side of the light-shielding region R2 of the light shielding plate 214. The light-emitting elements 2112 of the light source 211 emit light beams L. After the light beams L are introduced into the light guide plate 212 through the light input surface 2121 of the light guide plate 212, the light beams L are alternately reflected by the light-shielding region R2 and the reflecting plate 213. Then, the light beams L are exited from the light exit surface 2122 of the light guide plate 212. Then, the light beams L exited from the light exit surface 2122 of the light guide plate 212 are transferred to the keyboard module 20 through the light-transmissible region R1 of the light shielding plate 214.

In the keyboard module 20, the membrane circuit board 2004 is locally light-transmissible, and the supporting plate 2005 comprises plural light-transmissible openings. Consequently, the light beams L emitted by the backlight module 21 can be transmitted through the membrane circuit board 2004 and the supporting plate 2005. In this way, each key structure 200 of the keyboard module 20 can produce the luminous effect.

For succinctness, only one light-transmissible region R1 and one light-shielding region R2 of the light shielding plate 214 are shown in FIG. 2. In fact, the light shielding plate 214 comprises plural light-transmissible regions R1 and plural light-shielding regions R2. The light-transmissible regions R1 are aligned with the corresponding key structures 200 of the keyboard module 20. That is, the shapes and the sizes of the light-transmissible regions R1 match the shapes and the sizes of the corresponding key structures 200.

Please refer to FIG. 2 again. The conductive substrate 2111 comprises a lateral wall W, a first extension wall W1 and a second extension wall W2. The first extension wall W1 is extended from a first end E1 of the lateral wall W and located over the light guide plate 212. That is, the first extension wall W1 is arranged between the light guide plate 212 and the light shielding plate 214. The second extension wall W2 is extended from a second end E2 of the lateral wall W and located under the reflecting plate 213. The second E2 and the first end E1 are opposed to each other. The plural light-emitting elements 2112 are arranged between the lateral wall W of the conductive substrate 2111 and the light input surface 2121 of the light guide plate 212. Since the plural light-emitting elements 2112 are installed on the lateral wall W of the conductive substrate 2111, the plural light-emitting elements 2112 are located beside the light input surface 2121 of the light guide plate 212. After the light beams L are emitted by the light-emitting elements 2112, the light beams L are immediately fed into the light guide plate 212 through the light input surface 2121. In this way, the possibility of leaking out the light beams L is minimized, and the luminous efficiency is enhanced.

In an embodiment, a silver paste wiring layer (not shown) is arranged between the conductive substrate 2111 and the plural light-emitting elements 2112. That is, the silver paste wiring layer is printed on an inner side of the conductive substrate 2111 (i.e., the side facing the light guide plate 212), and the plural light-emitting elements 2112 are electrically connected with the conductive substrate 2111. The conductive substrate 2111 further a cable (not show), which is electrically connected with the silver paste wiring layer. When the backlight module 21 is electrically connected with an external device (e.g., a computer) through the cable of the conductive substrate 2111, the external device can control the illumination of the plural light-emitting elements 2112 through the cable of the conductive substrate 2111 and the silver paste wiring layer.

Moreover, after the conductive substrate 2111 of the light source 21 is penetrated through the second slot H2 of the reflecting plate 213 and the first slot H1 of the light guide plate 212, the backlight module 21 is divided into two zones. That is, the left side of the conductive substrate 2111 (i.e., the left side of the lateral wall W) is a non-luminous zone, and the right side of the conductive substrate 2111 (i.e., the right side of the lateral wall W) is a luminous zone. The luminous zone of the backlight module 21 is aligned with the key structure 200 of the keyboard module 20. The non-luminous zone of the backlight module 21 is aligned with a periphery region of the keyboard module 20 without the key structure.

In this embodiment, the conductive substrate 2111 is an insulation substrate. Preferably but not exclusively, the material of the insulation substrate is polyethylene terephthalate (PET), polyethylene naphthalate (PEN) or polyimide (PI). In another embodiment, the conductive substrate 2111 is a transparent substrate, an opaque substrate or a translucent substrate that is made of glass, polycarbonate (PC) or polymethyl methacrylate (PMMA).

Figure 3:
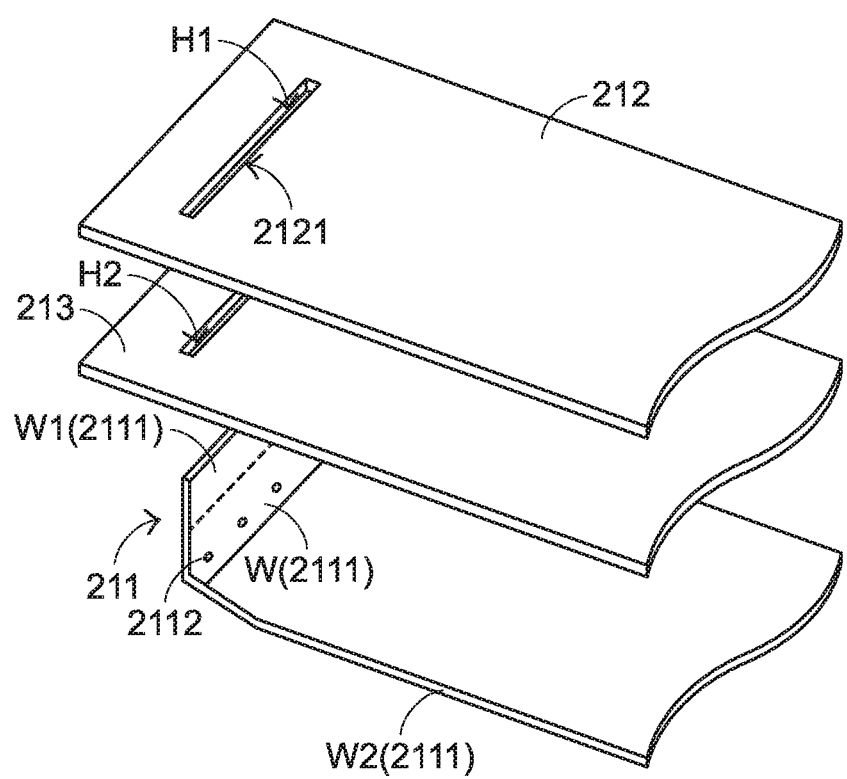
FIG. 3 is a schematic exploded view illustrating the relationship between the light source, the light guide plate and the reflecting plate of the backlight module as shown in FIG. 2.
Figure 4:
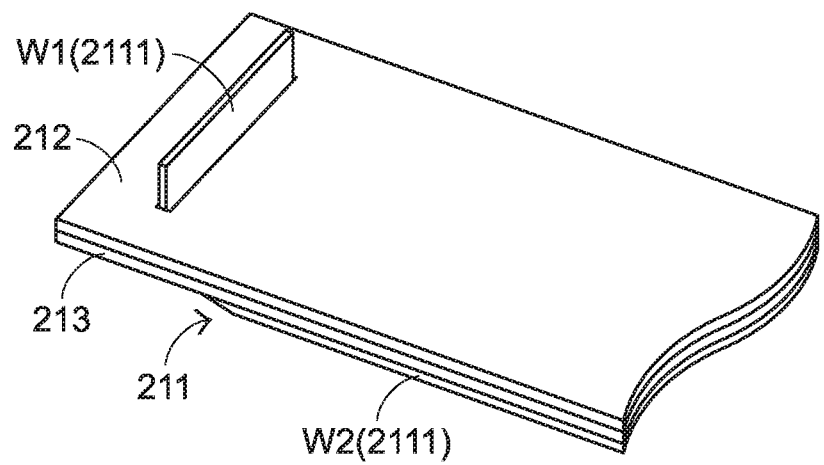
FIG. 4 is a schematic perspective view illustrating an assembled structure of the light source, the light guide plate and the reflecting plate of the backlight module as shown in FIG. 2.
Figure 5:
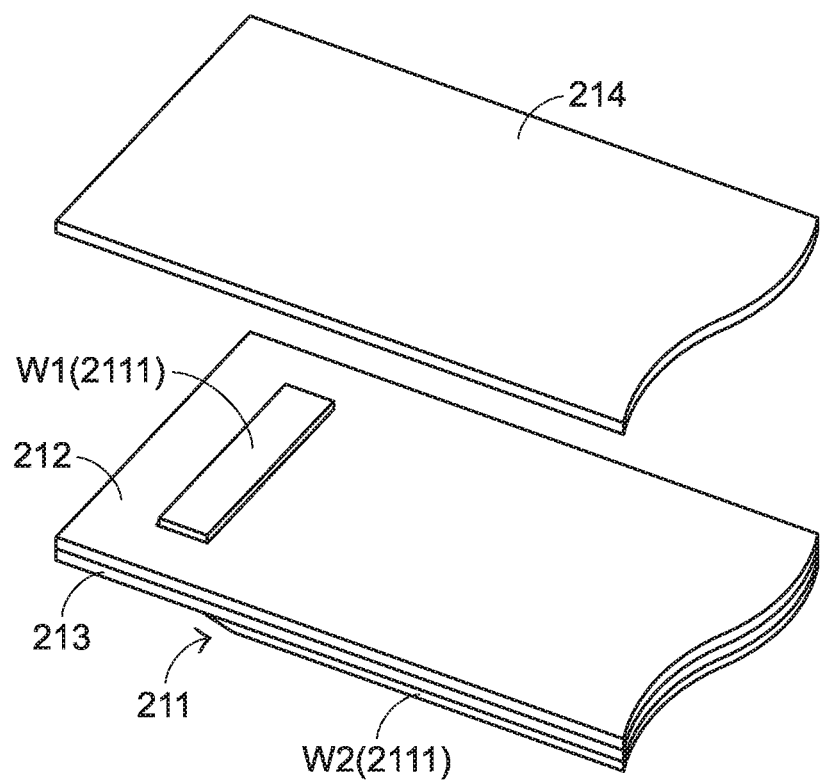
FIG. 5 is a schematic perspective view illustrating the assembled structure of the backlight module as shown in FIG. 2.

Hereinafter, a process of assembling the backlight module as shown in FIG. 2 will be illustrated with reference to FIGS. 3, 4 and 5. FIG. 3 is a schematic exploded view illustrating the relationship between the light source, the light guide plate and the reflecting plate of the backlight module as shown in FIG. 2. FIG. 4 is a schematic perspective view illustrating an assembled structure of the light source, the light guide plate and the reflecting plate of the backlight module as shown in FIG. 2. FIG. 5 is a schematic perspective view illustrating the assembled structure of the backlight module as shown in FIG. 2.

Please refer to FIG. 3. Firstly, the light guide plate 212 with the first slot H1, the reflecting plate 213 with the second slot H2 and the light source 211 are provided. In this step, the second extension wall W2 of the conductive substrate 2111 of the light source 211 is bent. Consequently, a top surface of the second extension wall W2 faces a bottom surface of the reflecting plate 213. Meanwhile, the first extension wall W1 is not bent. Then, the lateral wall W of the conductive substrate 2111 and the first extension wall W1 are aligned with the first slot H1 of the light guide plate 212 and the second slot H2 of the reflecting plate 213.

Please refer to FIG. 4. Then, the light guide plate 212 and the reflecting plate 213 are assembled with each other. Consequently, the first slot H1 and the second slot H2 are in communication with each other. Then, the lateral wall W and the first extension wall W1 of the conductive substrate 2111 of the light source 211 are penetrated through the second slot H2 and the first slot H1, which are in communication with each other. Meanwhile, the plural light-emitting elements 2112 installed on the lateral wall W are disposed within the first slot H1 and aligned with the light input surface 2121 of the light guide plate 212 (see FIG. 2). In addition, the second extension wall W2 of the conductive substrate 2111 is located under the reflecting plate 213, and the first extension wall W1 of the conductive substrate 2111 is exposed outside the light guide plate 212.

Please refer to FIG. 5. Then, the first extension wall W1 exposed outside the light guide plate 212 is bent. Consequently, the first extension wall W1 is located over the light guide plate 212. Then, the light shielding plate 214 is placed over the light guide plate 212 to cover the light guide plate 212. Meanwhile, the assembled structure of the backlight module 21 as shown is produced.

From the above descriptions, the present invention provides the luminous keyboard. The light source of the backlight module comprises the conductive substrate and the plural light-emitting elements on the conductive substrate. After the conductive substrate is penetrated through the second slot of the reflecting plate and the first slot of the light guide plate, the plural light-emitting elements are disposed within the first slot of the light guide plate and aligned with the light input surface of the light guide plate. Due to this structural design, the light beams from the plural light-emitting elements on the conductive substrate can be directly introduced into the light guide plate without any refection. Consequently, the light utilization loss is effectively reduced, and the luminous efficiency is enhanced. Moreover, the conductive substrate of the light source is a cost-effective insulation substrate (e.g., a PET substrate) in replace of the costly flexible printed circuit board (FPC) of the conventional backlight module. Since the PET substrate has higher rigidity than the flexible printed circuit board (FPC), the plural light-emitting elements can be upright located beside the light input surface of the light guide plate and the plural light-emitting elements can be stably aligned with the light input surface of the light guide plate without deviation. In other words, the backlight module of the present invention can provide the better luminous efficiency while largely reducing the fabricating cost.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A luminous keyboard, comprising:
a keyboard module; and
a backlight module located under the keyboard module, and comprising:
a light source comprising a conductive substrate and plural light-emitting elements, wherein the plural light-emitting elements are installed on the conductive substrate;
a light guide plate comprising a light input surface, a light exit surface, a bottom surface and a first slot, wherein the light input surface is arranged between the light exit surface and the bottom surface, the light exit surface is located at a first side of the light guide plate close to the keyboard module, the bottom surface is located at a second side of the light guide plate away from the keyboard module, the first slot runs through the light guide plate from the light exit surface to the bottom surface, and the light input surface is disposed within the first slot; and
a reflecting plate disposed on the bottom surface of the light guide plate, and comprising a second slot, wherein the second slot is in communication with the first slot,
wherein the conductive substrate comprises a lateral wall, a first extension wall and a second extension wall, wherein the first extension wall is extended from a first end of the lateral wall and located over the light guide plate, the second extension wall is extended from a second end of the lateral wall and located under the reflecting plate, the second end and the first end of the lateral wall are opposed to each other, and the plural light-emitting elements are arranged between the lateral wall and the light input surface of the light guide plate, wherein the conductive substrate is penetrated through the second slot and the first slot, so that the plural light-emitting elements are accommodated within the first slot and aligned with the light input surface.

2. The luminous keyboard according to claim 1, wherein the conductive substrate is a transparent substrate, an opaque substrate, a translucent substrate or an insulation substrate.

3. The luminous keyboard according to claim 1, wherein the conductive substrate is made of polyethylene terephthalate (PET), polyethylene naphthalate (PEN), polyimide (PI), glass, polycarbonate (PC) or polymethyl methacrylate (PMMA).

4. The luminous keyboard according to claim 1, wherein the plural light-emitting elements are micro light-emitting diodes.

5. The luminous keyboard according to claim 1, wherein the backlight module further comprises a light shielding plate, and the light shielding plate is arranged between the keyboard module and the light guide plate, wherein the light shielding plate comprises at least one light-transmissible region and at least one light-shielding region.

6. The luminous keyboard according to claim 5, wherein the plural light-emitting elements emit light beams, wherein after the light beams are introduced into the light guide plate through the light input surface of the light guide plate, the light beams are exited from the light exit surface of the light guide plate, wherein after the light beams are exited from the light exit surface of the light guide plate, the light beams are transmitted through the at least one light-transmissible region of the light shielding plate and transferred to the keyboard module.

* * * * *